(12) United States Patent
Burroughs et al.

(10) Patent No.: US 8,897,801 B2
(45) Date of Patent: Nov. 25, 2014

(54) TRANSMISSION OF LOCATION INFORMATION BY A TRANSMITTER AS AN AID TO LOCATION SERVICES

(75) Inventors: Kirk Allan Burroughs, Alamo, CA (US); Ravindra M. Patwardhan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 924 days.

(21) Appl. No.: 12/391,991

(22) Filed: Feb. 24, 2009

(65) Prior Publication Data

US 2009/0312034 A1  Dec. 17, 2009

Related U.S. Application Data

(60) Provisional application No. 61/061,429, filed on Jun. 13, 2008, provisional application No. 61/091,023, filed on Aug. 22, 2008.

(51) Int. Cl.
| | |
|---|---|
| *H04W 24/00* | (2009.01) |
| *G01S 19/06* | (2010.01) |
| *G01S 5/00* | (2006.01) |
| *G01S 5/02* | (2010.01) |
| *G01S 13/46* | (2006.01) |

(52) U.S. Cl.
CPC .............. *G01S 19/06* (2013.01); *G01S 5/0009* (2013.01); *G01S 5/0236* (2013.01); *G01S 2013/466* (2013.01)
USPC ................... 455/456.1; 370/328; 342/357.69

(58) Field of Classification Search
USPC ..................................................... 455/456.1
See application file for complete search history.

(56) References Cited

U.S. PATENT DOCUMENTS

| | | | |
|---|---|---|---|
| 5,276,905 A | 1/1994 | Hurst et al. | |
| 5,327,144 A | 7/1994 | Stilp et al. | |

(Continued)

FOREIGN PATENT DOCUMENTS

| | | |
|---|---|---|
| CN | 101000370 A | 7/2007 |
| CN | 101126802 A | 2/2008 |

(Continued)

OTHER PUBLICATIONS

3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIA/IS-801-1).

(Continued)

*Primary Examiner* — Gerald Johnson
(74) *Attorney, Agent, or Firm* — Linda Gunderson

(57) ABSTRACT

Techniques for transmitting location information as an aid to location services are described. In one design, a transmitter may generate a message including coordinate information and uncertainty information for the location of the transmitter. The coordinate information may include latitude and longitude for horizontal location and possibly the height of the transmitter. The uncertainty information may include uncertainty of the horizontal location and possibly uncertainty of the height of the transmitter. The horizontal location uncertainty may be given by a radius of a circle centered at the latitude and longitude of the transmitter. The height uncertainty may be given by a deviation from the height of the transmitter. The transmitter may send the message to at least one receiver in a wireless network. The transmitter may be a base station that may broadcast the message to terminals within its coverage.

42 Claims, 6 Drawing Sheets

(56) References Cited

U.S. PATENT DOCUMENTS

| | | |
|---|---|---|
| 5,512,908 A | 4/1996 | Herrick |
| 5,708,975 A | 1/1998 | Heiskari et al. |
| 5,717,406 A | 2/1998 | Sanderford et al. |
| 5,812,087 A | 9/1998 | Krasner |
| 5,841,396 A | 11/1998 | Krasner |
| 5,864,764 A | 1/1999 | Thro et al. |
| 5,874,914 A | 2/1999 | Krasner |
| 5,945,944 A | 8/1999 | Krasner |
| 5,999,124 A | 12/1999 | Sheynblat |
| 6,055,434 A | 4/2000 | Seraj |
| 6,061,018 A | 5/2000 | Sheynblat |
| 6,111,538 A | 8/2000 | Schuchman et al. |
| 6,185,427 B1 | 2/2001 | Krasner et al. |
| 6,208,290 B1 | 3/2001 | Krasner |
| 6,215,442 B1 | 4/2001 | Sheynblat et al. |
| 6,236,365 B1 | 5/2001 | LeBlanc et al. |
| 6,236,635 B1 | 5/2001 | Miyamoto et al. |
| 6,271,788 B1 | 8/2001 | Longaker et al. |
| 6,389,291 B1 | 5/2002 | Pande et al. |
| 6,430,415 B1 | 8/2002 | Agashe et al. |
| 6,466,938 B1 | 10/2002 | Goldberg |
| 6,677,894 B2 | 1/2004 | Sheynblat et al. |
| 6,677,895 B1 | 1/2004 | Holt |
| 6,704,574 B2 | 3/2004 | Lin |
| 6,754,488 B1 | 6/2004 | Won et al. |
| 6,801,778 B2 | 10/2004 | Koorapaty et al. |
| 6,865,395 B2 * | 3/2005 | Riley ........................ 455/456.1 |
| 6,888,811 B2 | 5/2005 | Eaton et al. |
| 6,937,867 B2 | 8/2005 | Oda et al. |
| 6,941,145 B2 | 9/2005 | Ogino et al. |
| 6,956,527 B2 | 10/2005 | Rogers et al. |
| 6,973,320 B2 | 12/2005 | Brown et al. |
| 7,006,838 B2 | 2/2006 | Diener et al. |
| 7,035,637 B2 | 4/2006 | Motegi et al. |
| 7,039,418 B2 | 5/2006 | Amerga et al. |
| 7,068,999 B2 | 6/2006 | Ballai |
| 7,127,257 B2 | 10/2006 | Riley et al. |
| 7,139,580 B2 | 11/2006 | Stein et al. |
| 7,142,848 B2 | 11/2006 | Owen et al. |
| 7,149,531 B2 | 12/2006 | Misikangas |
| 7,171,216 B1 * | 1/2007 | Choksi ....................... 455/456.1 |
| 7,206,585 B2 | 4/2007 | Gilham et al. |
| 7,215,281 B2 | 5/2007 | Tekinay et al. |
| 7,248,858 B2 | 7/2007 | Barber et al. |
| 7,257,411 B2 | 8/2007 | Gwon et al. |
| 7,280,505 B2 | 10/2007 | Chaskar et al. |
| 7,319,878 B2 | 1/2008 | Sheynblat et al. |
| 7,369,859 B2 | 5/2008 | Gallagher |
| 2002/0137526 A1 | 9/2002 | Shinohara |
| 2003/0006931 A1 | 1/2003 | Mages |
| 2003/0008663 A1 | 1/2003 | Stein et al. |
| 2003/0008664 A1 | 1/2003 | Stein et al. |
| 2003/0022675 A1 | 1/2003 | Mergler |
| 2003/0050077 A1 * | 3/2003 | Takeuchi et al. .............. 455/456 |
| 2003/0144006 A1 | 7/2003 | Johansson et al. |
| 2003/0210656 A1 | 11/2003 | Biacs et al. |
| 2004/0203567 A1 | 10/2004 | Berger |
| 2004/0203875 A1 * | 10/2004 | Korneluk et al. .......... 455/456.1 |
| 2005/0037775 A1 | 2/2005 | Moeglein et al. |
| 2005/0064877 A1 | 3/2005 | Gum et al. |
| 2005/0090266 A1 | 4/2005 | Sheynblat |
| 2005/0227689 A1 | 10/2005 | Jewett |
| 2005/0285783 A1 * | 12/2005 | Harper ...................... 342/357.15 |
| 2006/0116131 A1 * | 6/2006 | Morgan et al. ............. 455/456.1 |
| 2006/0217130 A1 * | 9/2006 | Rowitch et al. ............ 455/456.1 |
| 2006/0268768 A1 * | 11/2006 | Harris et al. ................... 370/328 |
| 2007/0270168 A1 | 11/2007 | Sheynblat |

FOREIGN PATENT DOCUMENTS

| | | |
|---|---|---|
| DE | 10142954 | 4/2003 |
| EP | 0933961 | 8/1999 |
| EP | 1215928 | 6/2002 |
| EP | 1289320 | 3/2003 |
| JP | 2001238247 | 8/2001 |
| JP | 2003174665 A | 6/2003 |
| JP | 2006501478 A | 1/2006 |
| KR | 100564074 B1 | 3/2006 |
| KR | 100723825 B1 | 6/2007 |
| KR | 20070085543 A | 8/2007 |
| RU | 2292646 C2 | 1/2007 |
| WO | 03010552 | 2/2003 |
| WO | 03058986 | 7/2003 |
| WO | 2004032561 | 4/2004 |
| WO | 2005004527 | 1/2005 |
| WO | 2005004528 | 1/2005 |
| WO | 2006029277 | 3/2006 |
| WO | 2006031150 A1 | 3/2006 |
| WO | 2007025159 | 3/2007 |

OTHER PUBLICATIONS

International Search Report and Written Opinion—PCT/US2009/047274, International Search Authority—European Patent Office—Nov. 6, 2009.

Taiwan Search Report—TW098119961—TIPO—Sep. 5, 2012.

\* cited by examiner

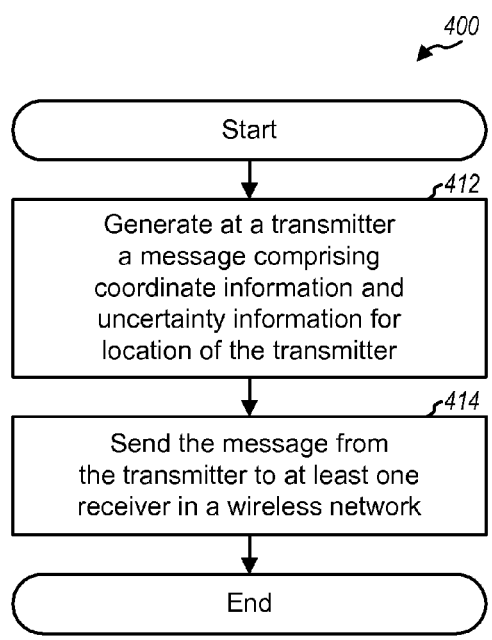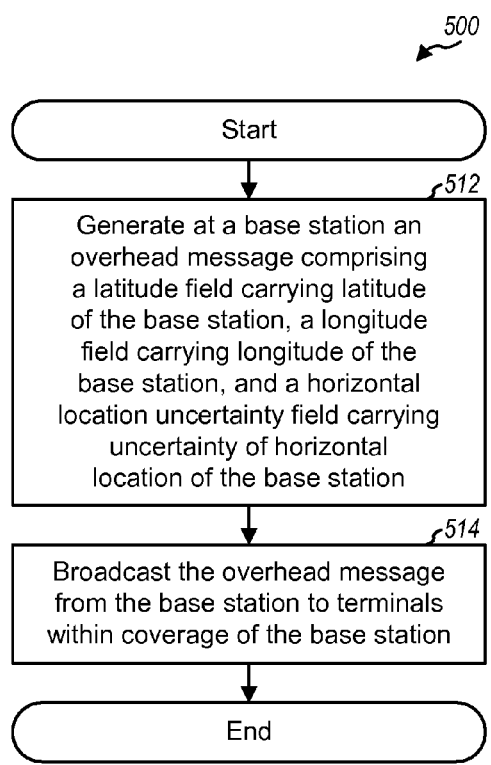
FIG. 4
FIG. 5

TRANSMISSION OF LOCATION INFORMATION BY A TRANSMITTER AS AN AID TO LOCATION SERVICES

CLAIM OF PRIORITY UNDER 35 U.S.C. §119

The present Application for Patent claims priority to Provisional U.S. Application Ser. No. 61/061,429, filed Jun. 13, 2008, and Provisional U.S. Application Ser. No. 61/091,023, filed Aug. 22, 2008, both entitled "TRANSMITTERS BROADCASTING THEIR LOCATION INFORMATION AS AN AID TO LOCATION SERVICES," assigned to the assignee hereof, and expressly incorporated herein by reference.

BACKGROUND

I. Field

The present disclosure relates generally to communication, and more specifically to techniques for transmitting location information.

II. Background

It is often desirable, and sometimes necessary, to know the location of a terminal, e.g., a cellular phone. The terms "location" and "position" are synonymous and are used interchangeably herein. For example, a client may desire to know the location of the terminal and may communicate with a location center to request for the terminal location. The location center and the terminal may then exchange messages, as necessary, to obtain a location estimate for the terminal. The location center may then return the location estimate to the client.

The location of the terminal may be determined based on various positioning methods. Most of these positioning methods may achieve improved performance (e.g., provide a location estimate faster) if a rough estimate of the terminal location is known. The terminal may obtain this rough location estimate by establishing a positioning session with the location server and exchanging signaling messages with the location server. However, signaling overhead and additional delay may be incurred to obtain a rough location estimate in this manner. It may be desirable to obtain the rough location estimate in a more efficient manner.

SUMMARY

Techniques for transmitting location information as an aid to location services are described herein. In one design, a transmitter may generate a message comprising coordinate information and uncertainty information for the location of the transmitter. The coordinate information may comprise latitude and longitude for horizontal location of the transmitter. The uncertainty information may comprise uncertainty of the horizontal location, which may be given by a radius of a circle centered at the latitude and longitude of the transmitter. The circle may represent the coverage area of the transmitter or an area within which the transmitter or a receiver can be expected to be located with a particular degree of confidence. The coordinate information may further comprise the height of the transmitter. The uncertainty information may further comprise uncertainty of the height of the transmitter, which may be given by a deviation from the height. The transmitter may send the message to at least one receiver in a wireless network. In one design, the transmitter may be a base station. The message may be an overhead message that may be broadcast from the base station to all terminals within the coverage of the base station. The message may also be a unicast message that may be sent from the base station to a specific terminal.

In one design, a receiver (e.g., a terminal) may receive a message generated and sent by a transmitter to at least one receiver in a wireless network. The receiver may obtain coordinate information and uncertainty information for the location of the transmitter from the message. The receiver may use the coordinate information as a rough/initial location estimate for positioning to determine a more accurate/final location estimate for the receiver. The receiver may also determine whether to obtain assistance data for a global navigation satellite system (GNSS) based on the coordinate information and the uncertainty information. The receiver may also use the coordinate information and the uncertainty information for other purposes.

Various aspects and features of the disclosure are described in further detail below.

BRIEF DESCRIPTION OF THE DRAWINGS

FIG. 4 shows a process for sending location information by a transmitter.

FIG. 5 shows a process for broadcasting location information by a base station.

DETAILED DESCRIPTION

Figure 1:
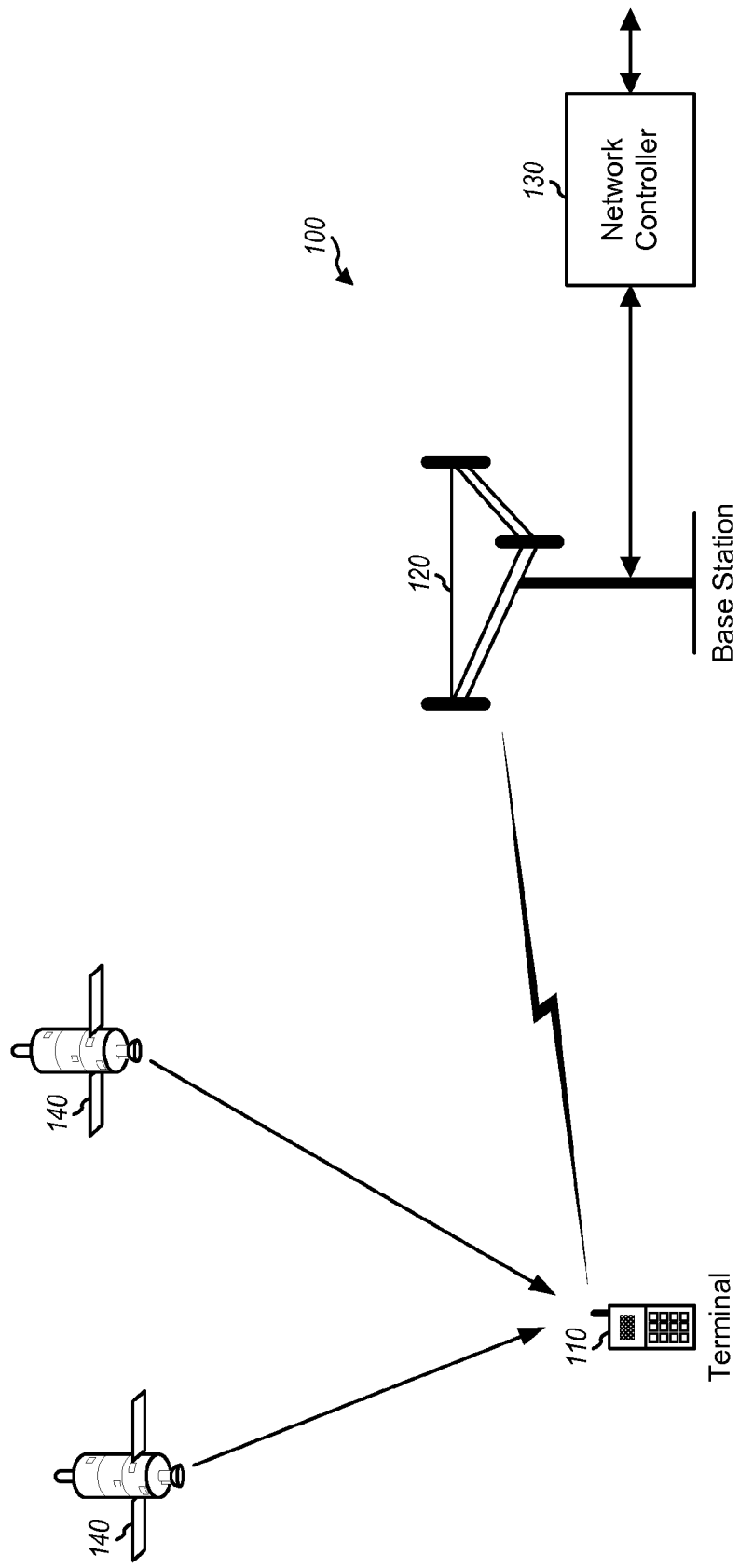
FIG. 1 shows a wireless network.

FIG. 1 shows a wireless network 100 in which the techniques described herein may be implemented. The terms "network" and "system" are often used interchangeably. Wireless network 100 may include a number of base stations and other network entities. For simplicity, only one base station 120 and one network controller 130 are shown in FIG. 1. A base station may be a fixed station that communicates with the terminals and may also be referred to as a Node B, an evolved Node B (eNB), an access point, etc. A base station may provide communication coverage for a particular geographic area. The overall coverage area of a base station may be partitioned into smaller areas, and each smaller area may be served by a respective base station subsystem. In 3GPP, the term "cell" can refer to the smallest coverage area of a base station and/or a base station subsystem serving this coverage area. In 3GPP2, the term "sector" or "cell-sector" can refer to the smallest coverage area of a base station and/or a base station subsystem serving this coverage area. For clarity, the term "cell" is used in much of the description below.

A base station may provide communication coverage for a macro cell, a pico cell, a femto cell, or some other type of cell. A macro cell may cover a relatively large geographic area (e.g., several kilometers in radius) and may support communication for terminals with service subscription in a wireless network. A pico cell may cover a relatively small geographic area and may support communication for terminals with service subscription. A femto cell may cover a relatively small geographic area (e.g., a home) and may support communication for terminals having association with the femto cell (e.g., terminals belonging to residents of the home). A base station for a macro cell may be referred to as a macro base station. A base station for a pico cell may be referred to as a pico base station. A base station for a femto cell may be referred to as a femto base station or a home base station.

A base station may also be a broadcast station that broadcasts information to terminals, e.g., broadcast receivers. A base station may also be a relay station that receives information from an upstream station and forwards the information to a downstream station. A base station may also be some other type of station.

Network controller 130 may couple to a set of base stations and may provide coordination and control for these base stations. Network controller 130 may also communicate with other network entities (not shown in FIG. 1), which may support various services for terminals.

A terminal 110 may communicate with base station 120 and/or may receive broadcast transmissions from base station 120. Terminal 110 may be stationary or mobile and may also be referred to as a mobile station, a user equipment, an access terminal, a subscriber unit, a station, etc. Terminal 110 may be a cellular phone, a personal digital assistant (PDA), a wireless communication device, a wireless modem, a handheld device, a handset, a laptop computer, a personal computer (PC), a broadcast receiver, etc.

Terminal 110 may also receive signals from one or more satellites 140, which may be part of the United States Global Positioning System (GPS), the European Galileo system, the Russian GLONASS system, or some other GNSS. Terminal 110 may measure signals from satellites 140 and obtain pseudo-range measurements for the satellites. Terminal 110 may also measure signals from base stations and obtain timing measurements for the base stations. The pseudo-range measurements and/or the timing measurements may be used to derive a location estimate for terminal 110. A location estimate may also be referred to as a position estimate, a position fix, etc.

Wireless network 100 may be a wireless wide area network (WWAN), a wireless metropolitan area network (WMAN), a wireless local area network (WLAN), a broadcast network, etc. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as cdma2000, Universal Terrestrial Radio Access (UTRA), etc. cdma2000 covers IS-2000, IS-95 and IS-856 standards. UTRA includes Wideband CDMA (WCDMA) and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). A WMAN may implement a radio technology such as IEEE 802.16, which is commonly referred to as WiMAX. A WLAN may implement a radio technology such as IEEE 802.11, Hiperlan, etc. IEEE 802.11 is commonly referred to as Wi-Fi. A broadcast network may implement a radio technology such as MediaFLO™, Digital Video Broadcasting for Handhelds (DVB-H), Integrated Services Digital Broadcasting for Terrestrial Television Broadcasting (ISDB-T), etc.

The techniques described herein may be used for the wireless networks and radio technologies described above as well as other wireless networks and radio technologies. For clarity, certain aspects of the techniques are described below for IS-2000 and IS-856. IS-2000 Releases 0 and A are commonly referred to as CDMA2000 1X, or simply, 1X. IS-2000 Release C is commonly referred to as CDMA2000 1xEV-DV, or simply, 1xEV-DV. IS-2000 Release E is currently being developed. IS-856 is commonly referred to as CDMA2000 1xEV-DO, 1xEV-DO, EV-DO, High Rate Packet Data (HRPD), High Data Rate (HDR), etc In an aspect, a transmitter may send its location information as an aid to location services. The transmitter may be a base station, a terminal, etc. The location information may describe the location of the transmitter and may comprise coordinate information and uncertainty information.

In one design, the coordinate information may comprise (i) latitude and longitude for horizontal location of the transmitter, i.e., X and Y coordinate, (ii) latitude, longitude and altitude of the transmitter, i.e., X, Y and Z coordinate, (iii) civil location such as a street address, or (iv) some other information describing the location of the transmitter. Altitude may be valuable especially in geographic areas of extreme height or depth, e.g., high altitude in Denver, Colo. or low altitude in Death Valley, Calif. Altitude may also be referred to as height, elevation, vertical location, etc.

In one design, the uncertainty information may comprise horizontal location uncertainty and/or vertical location uncertainty. Horizontal location uncertainty may describe uncertainty of the horizontal location of the transmitter, as given by the coordinate information. Vertical location uncertainty may describe uncertainty of the height of the transmitter, as given by the coordinate information. The uncertainty information may be valuable in determining the amount of uncertainty in the reported location, the confidence in the reported location, and/or for other purposes.

In one design, the location information may comprise horizontal location and horizontal location uncertainty for the transmitter. In another design, the location information may comprise horizontal location, horizontal location uncertainty, vertical location, and vertical location uncertainty for the transmitter. In other designs, the location information may comprise other information describing the location of the transmitter.

Figure 2:
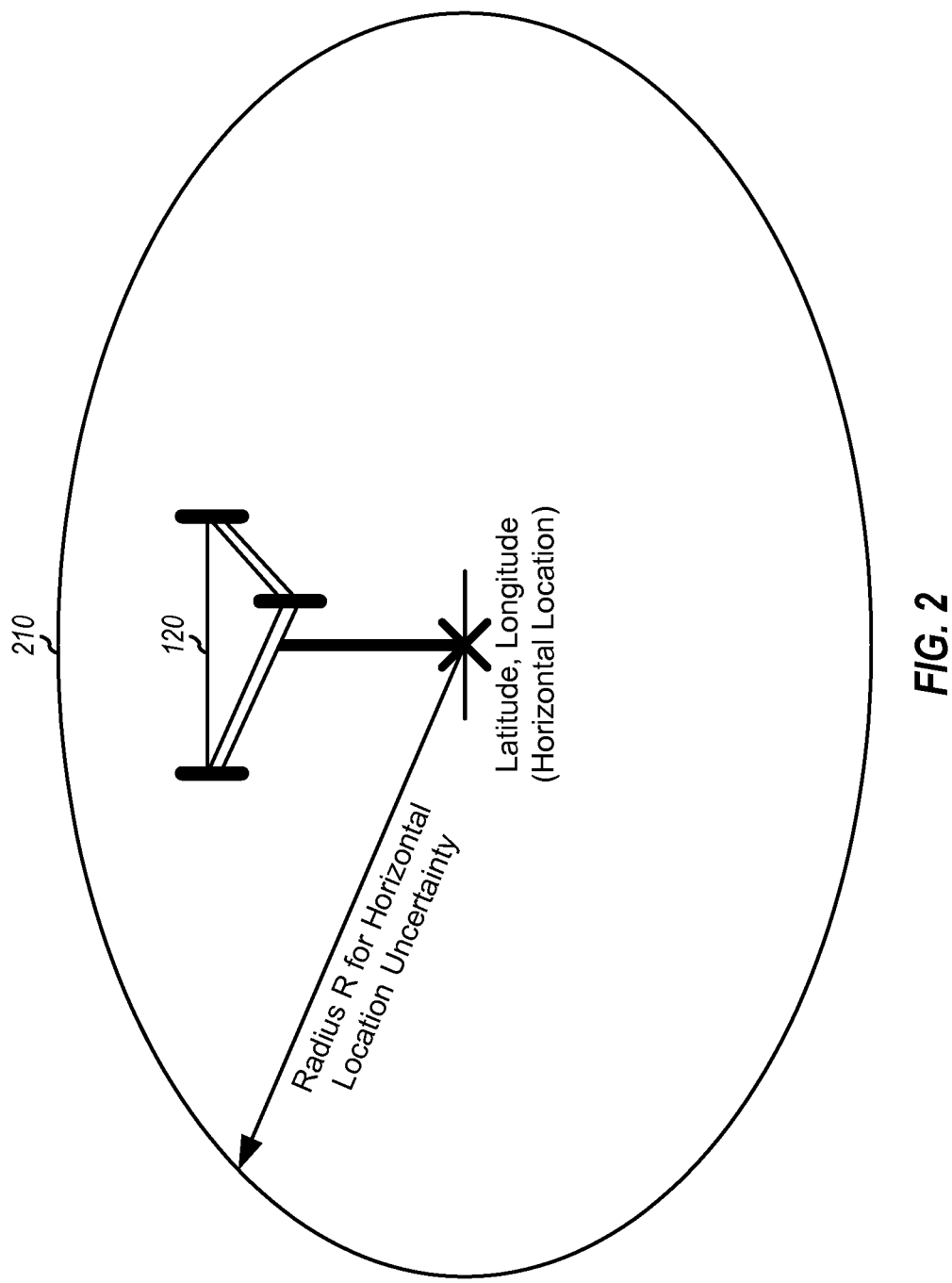
FIG. 2 shows horizontal location and horizontal location uncertainty for a base station.

FIG. 2 shows horizontal location and horizontal location uncertainty for base station 120 in FIG. 1. The horizontal location of base station 120 may be given by a latitude and a longitude. In the design shown in FIG. 2, the horizontal location uncertainty may be described by a circle 210 centered at the latitude and longitude of base station 120 and having a radius of R. The horizontal location uncertainty may thus be given by radius R.

The horizontal location uncertainty may be defined in various manners. In one design, circle 210 may be defined as an X percent confidence coverage area, which means that circle 210 around the coverage center would encompass at least X percent of the coverage area of base station 120. X may be equal to 90, 95, etc. In another design, circle 210 may be defined as an area within which X percent of all terminals within the coverage area of base station 120 are located. Thus, a terminal that can receive the location information from base station 120 has an X percent chance of being within circle 210. The coverage area center may be loosely associated with the location of base station 120. The horizontal location uncertainty may also be defined in other manners. For all designs, the horizontal location uncertainty may be determined based on the coverage area of base station 120, the size of the cell, etc. The coverage area may in turn be dependent on various factors such as the transmit power level of base station 120, an antenna pattern for the cell, terrain, etc. For example, a base station for a macro cell may have a relatively large horizontal location uncertainty whereas a base station for a pico or femto cell may have a relatively small horizontal location uncertainty.

In other designs, the horizontal location uncertainty may be defined by an ellipse, a wedge, or some other geometric shape instead of a circle. An ellipse may be centered at the horizontal location and may be defined by a semi-major axis and a semi-minor axis. A wedge may have its end point placed at the horizontal location and may be defined by a radius, an angle width, and a direction. For clarity, much of the description below assumes the use of a circle for horizontal location uncertainty.

Figure 3:
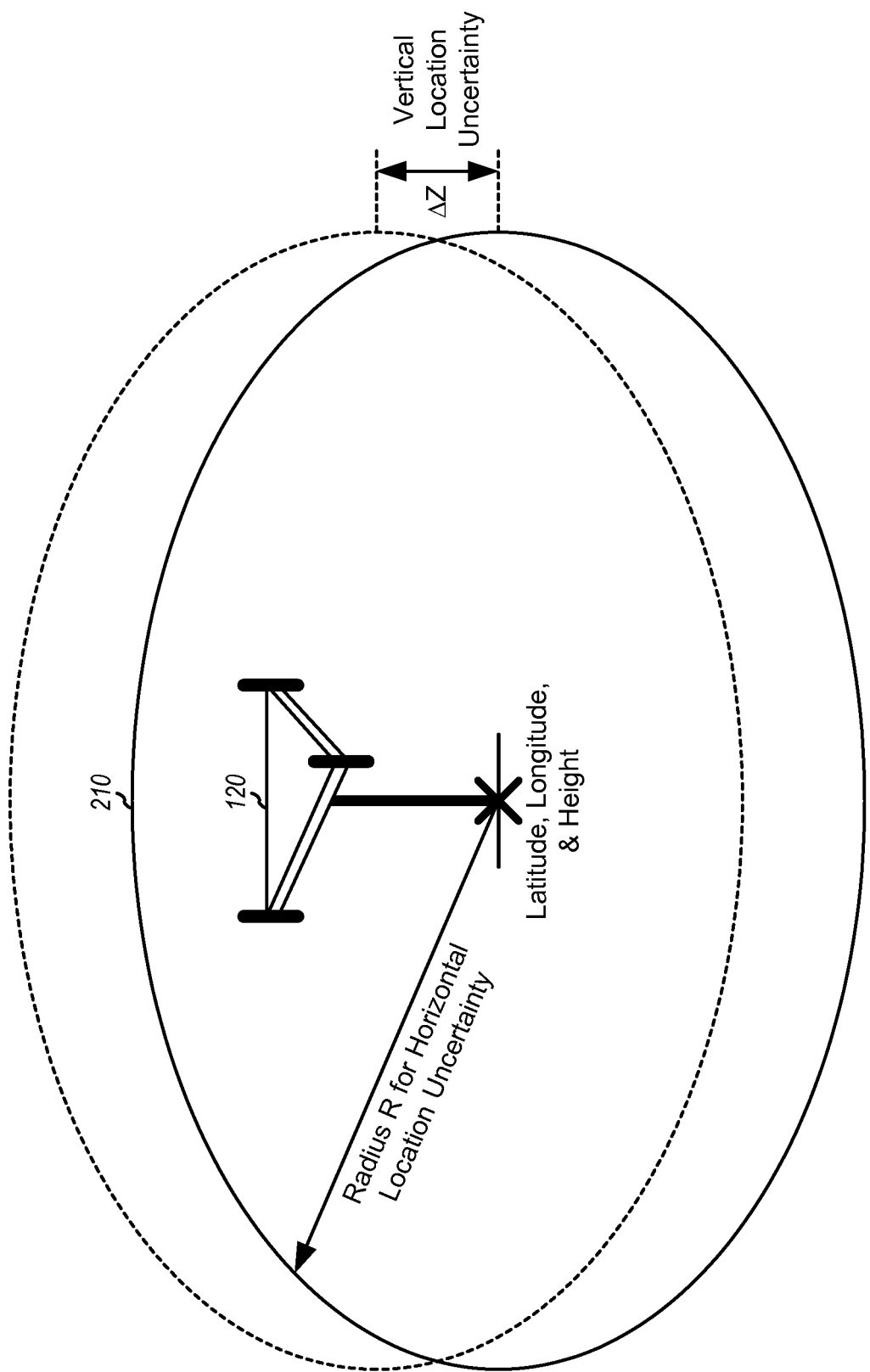
FIG. 3 shows horizontal and vertical location and horizontal and vertical location uncertainty for a base station.

FIG. 3 shows horizontal location, horizontal location uncertainty, vertical location, and vertical location uncertainty for base station 120 in FIG. 1. The horizontal location and the horizontal location uncertainty for base station 120 may be given as described above for FIG. 2. The vertical location for base station 120 may be given by a height relative to a reference. In one design, the vertical location may be given by a height above a WGS-84 reference ellipsoid in units of 1 meter. In the design shown in FIG. 3, the vertical location uncertainty may be given by a deviation of ±ΔZ from the reported height. ΔZ may represent a one-sigma uncertainty of the height of base station 120 within the corresponding horizontal location uncertainty. The vertical location uncertainty may also be defined in other manners.

Base station 120 may transmit its location information in various manners. In one design, base station 120 may broadcast its location information in one or more overhead messages that may be received by terminals within the coverage of base station 120. The overhead messages may provide pertinent information to the terminals, e.g., information used to operate with base station 120. Different overhead messages may be sent on different channels in different wireless networks and radio technologies. For IS-2000, an overhead message may be a System Parameters Message sent on a paging channel, an MC-RR Parameters Message sent on a primary broadcast control channel, etc. MC-RR stands for multi-carrier radio resource.

In another design, base station 120 may send its location information in a unicast message sent to a specific terminal. The location information may be sent in different unicast messages in different wireless networks and radio technologies. For IS-2000, the location information may be sent in a unicast message such as a Mobile Station Registered Message, a Base Station Status Response Message, etc.

Table 1 shows a design of sending location information for base station 120 in a System Parameters Message. For simplicity, Table 1 shows only fields for location information as well as a small subset of the fields that may be sent in the System Parameters Message.

TABLE 1

Fields of System Parameters Message

| Field | Length (bits) |
| --- | --- |
| PILOT_PN | 9 |
| CONFIG_MSG_SEQ | 6 |
| [...] | |
| BASE_LAT | 22 |
| BASE_LONG | 23 |
| [...] | |
| ADD_LOC_INFO_INCL | 1 |
| LOC_UNC_H | 0 or 4 |
| HEIGHT | 0 or 14 |
| LOC_UNC_V | 0 or 4 |

The PILOT_PN field may carry a pilot pseudo-random number (PN) sequence offset for base station 120. The CONFIG_MSG_SEQ field may carry a configuration message sequence number for the System Parameters Message. Base station 120 may increment the sequence number whenever the content of the System Parameters Message changes. The sequence number may be used by the terminals to determine whether or not they should update their stored information with new information in the System Parameters Message.

The BASE_LAT field may carry the latitude of base station 120. Base station 120 may set this field to its latitude in units of 0.25 second, expressed as a two's complement signed number with positive numbers signifying North latitudes. Base station 120 may set this field to a value within a range of −1,296,000 to 1,296,000 inclusive, which may correspond to a range of −90° to +90°. Base station 120 may also set this field to all zeros if its latitude is not known.

The BASE_LONG field may carry the longitude of base station 120. Base station 120 may set this field to its longitude in units of 0.25 second, expressed as a two's complement signed number with positive numbers signifying East longitude. Base station 120 may set this field to a value within a range of −2,592,000 to 2,592,000 inclusive, which may correspond to a range of −180° to +180°. Base station 120 may also set this field to all zeros if its longitude is not known.

In IS-2000 Release D and earlier, the BASE_LAT and BASE_LONG fields may be set to any values based on discretion of a network operator. The network operator may set these fields to the correct latitude and longitude of base station 120 (if the horizontal location is known) or to incorrect/random values (if the horizontal location is not known). Transmitting wrong latitude and longitude may adversely impact the performance of terminals that rely on the values in these fields. These fields may be set to designated values of all zeros to indicate unknown latitude and longitude and may then be ignored by the terminals.

The ADD_LOC_INFO_INCL field may indicate whether additional location information for base station 120 is included in the System Parameters Message. Base station 120 may set this field to '1' to indicate that the LOC_UNC_H, HEIGHT, and LOC_UNC_V fields are included in the message or to '0' otherwise.

The LOC_UNC_H field may carry the horizontal location uncertainty for base station 120. This field may be included in the System Parameters Message if the ADD_LOC_INFO_INCL field is set to '1' and may be omitted otherwise. If included, this field may be set as described below.

The HEIGHT field may carry the height of base station 120. This field may be included in the System Parameters Message if the ADD_LOC_INFO_INCL field is set to '1' and may be omitted otherwise. If included, base station 120 may set this field to its height, above the WGS-84 reference ellipsoid, in units of 1 meter and within a range of −500 meters to 15,882 meters. A binary value of this field may convey the height plus 500 meters. Base station 120 may also set this field to all ones if its height is not known.

The LOC_UNC_V field may carry the vertical location uncertainty for base station 120. This field may be included in the System Parameters Message if the ADD_LOC_INFO_INCL field is set to '1' and may be omitted otherwise. If included, this field may be set as described below.

Table 2 shows a design of sending location information for base station 120 in an MC-RR Parameters Message. For simplicity, Table 2 shows only fields for location information as well as a small subset of the fields that may be sent in the MC-RR Parameters Message.

TABLE 2

Fields of MC-RR Parameters Message

| Field | Length (bits) |
|---|---|
| PILOT_PN | 9 |
| CONFIG_MSG_SEQ | 6 |
| [ . . . ] | |
| CCH_INFO_INCL | 1 |
| [ . . . ] | |
| BASE_LAT | 0 or 22 |
| BASE_LONG | 0 or 23 |
| [ . . . ] | |
| ADD_LOC_INFO_INCL | 0 or 1 |
| LOC_UNC_H | 0 or 4 |
| HEIGHT | 0 or 14 |
| LOC_UNC_V | 0 or 4 |

The PILOT_PN field and the CONFIG_MSG_SEQ field are as described above for the System Parameters Message. The CCH_INFO_INCL field may be set to '1' to indicate that a set of fields for common channel information is included in the MC-RR Parameters Message. The BASE_LAT and BASE_LONG fields may be included in the MC-RR Parameters Message if the CCH_INFO_INCL field is set to '1'. In one design, the ADD_LOC_INFO_INCL field may also be included in the MC-RR Parameters Message if the CCH_INFO_INCL field is set to '1'. The ADD_LOC_INFO_INCL field may be set to '1' to indicate that the LOC_UNC_H, HEIGHT and LOC_UNC_V fields are included in the message. In another design, the LOC_UNC_H, HEIGHT and LOC_UNC_V fields may be included in the message if the CCH_INFO_INCL field is set to '1', and the ADD_LOC_INFO_INCL field may be omitted. The BASE_LAT, BASE_LONG, LOC_UNC_H, HEIGHT and LOC_UNC_V fields may also be selectively sent in the MC-RR Parameters Message based on other control fields or mechanisms. If included, the BASE_LAT, BASE_LONG, LOC_UNC_H, HEIGHT and LOC_UNC_V fields in the MC-RR Parameters Message may be set as described above for the System Parameters Message.

The BASE_LAT and BASE_LONG fields are included in the System Parameters Message and the MC-RR Parameters Message in IS-2000 Release D and earlier. The additional ADD_LOC_INFO_INCL, LOC_UNC_H, HEIGHT and LOC_UNC_V fields may be included in the System Parameters Message and the MC-RR Parameters Message in IS-2000 Release E and later. The additional fields may be included at the end of the System Parameters Message and the MC-RR Parameters Message, which may support backward compatibility with earlier releases of IS-2000. The additional fields may also be included in other parts of these messages. For example, the additional fields may be included in the set of fields for the common channel information in the MC-RR Parameters Message.

Table 3 gives horizontal position uncertainty in accordance with one design. Base station 120 may set the LOC_UNC_H field to a circular horizontal location uncertainty as specified in Table 3. The value of the LOC_UNC_H field may indicate the radius of a circular 95% confidence coverage area. Base station 120 may set the LOC_UNC_H field to all ones if its horizontal location is not known. Alternatively, the LOC_UNC_H field as well as the HEIGHT and LOC_UNC_V fields may be omitted if the horizontal location is not known. In Table 3, "m" denotes meter.

TABLE 3

Horizontal Location Uncertainty for LOC_UNC_H Field

| '0000' | LOC_UNC_H < 20 m |
| '0001' | 20 m ≤ LOC_UNC_H < 40 m |
| '0010' | 40 m ≤ LOC_UNC_H < 70 m |
| '0011' | 70 m ≤ LOC_UNC_H < 100 m |
| '0100' | 100 m ≤ LOC_UNC_H < 200 m |
| '0101' | 200 m ≤ LOC_UNC_H < 400 m |
| '0110' | 400 m ≤ LOC_UNC_H < 700 m |
| '0111' | 700 m ≤ LOC_UNC_H < 1,000 m |
| '1000' | 1,000 m ≤ LOC_UNC_H < 2,000 m |
| '1001' | 2,000 m ≤ LOC_UNC_H < 4,000 m |
| '1010' | 4,000 m ≤ LOC_UNC_H < 7,000 m |
| '1011' | 7,000 m ≤ LOC_UNC_H < 10,000 m |
| '1100' | 10,000 m ≤ LOC_UNC_H < 20,000 m |
| '1101' | 20,000 m ≤ LOC_UNC_H < 40,000 m |
| '1110' | 40,000 m ≤ LOC_UNC_H < 70,000 m |
| '1111' | 70,000 m ≤ LOC_UNC_H |

Table 4 gives vertical position uncertainty in accordance with one design. Base station 120 may set the LOC_UNC_V field to the vertical location uncertainty as specified in Table 4. The value of this field may indicate a one-sigma uncertainty of the height given in the HEIGHT field within the corresponding horizontal coverage area. Base station 120 may set the LOC_UNC_V field to all ones if its height is not known.

TABLE 4

Vertical Location Uncertainty for LOC_UNC_V Field

| '0000' | 0 < LOC_UNC_V < 1 m |
| '0001' | 1 m ≤ LOC_UNC_V < 2 m |
| '0010' | 2 m ≤ LOC_UNC_V < 4 m |
| '0011' | 4 m ≤ LOC_UNC_V < 7 m |
| '0100' | 7 m ≤ LOC_UNC_V < 10 m |
| '0101' | 10 m ≤ LOC_UNC_V < 20 m |
| '0110' | 20 m ≤ LOC_UNC_V < 40 m |
| '0111' | 40 m ≤ LOC_UNC_V < 70 m |
| '1000' | 70 m ≤ LOC_UNC_V < 100 m |
| '1001' | 100 m ≤ LOC_UNC_V < 200 m |
| '1010' | 200 m ≤ LOC_UNC_V < 400 m |

TABLE 4-continued

Vertical Location Uncertainty for LOC_UNC_V Field

| | |
|---|---|
| '1011' | 400 m ≤ LOC_UNC_V < 700 m |
| '1100' | 700 m ≤ LOC_UNC_V < 1,000 m |
| '1101' | 1,000 m ≤ LOC_UNC_V < 2,000 m |
| '1110' | 2,000 m ≤ LOC_UNC_V < 4,000 m |
| '1111' | 4,000 m ≤ LOC_UNC_V |

Tables 3 and 4 show example designs of the LOC_UNC_H and LOC_UNC_V fields. These location uncertainty fields may also be defined in other manners, e.g., with fewer or more bits.

Base station 120 may also send its location information in a Mobile Station Registered Message, a Base Station Status Response Message, or some other unicast message to a specific terminal. The location information may be sent in the BASE_LAT, BASE_LONG, LOC_UNC_H, HEIGHT and LOC_UNC_V fields, which may be set as described above.

Terminal 110 may receive overhead messages and/or unicast messages from one or more base stations. The overhead and/or unicast messages from each base station may include location information for that base station. For each overhead message, terminal 110 may determine whether the sequence number of that overhead message matches the sequence number stored at terminal 110 for that type of overhead message. If there is a match, then terminal 110 may ignore/discard the overhead message. If there is a mismatch, then terminal 110 may store the information in the overhead message. For example, terminal 110 may store the horizontal location sent in the BASE_LAT and BASE_LONG fields. Terminal 110 may also stored the horizontal location uncertainty sent in the LOC_UNC_H field, the vertical location sent in the HEIGHT field, and the vertical location uncertainty sent in the LOC_UNC_V field, if these fields are included in the overhead message. Terminal 110 may update the location information for each base station whenever an overhead message with a different sequence number is received from that base station. Terminal 110 may also update the location information for each base station based on location information included in a unicast message sent by that base station to terminal 110.

Terminal 110 may support one or more positioning methods such as GPS, assisted GPS (A-GPS), Advanced Forward Link Trilateration (AFLT), Enhanced Observed Time Difference (E-OTD), Observed Time Difference Of Arrival (OTDOA), etc. Positioning refers to a process to determine a location estimate for a target, which may be terminal 110. GPS is a positioning method based on measurements for satellites from GPS, Galileo, GLONASS, and/or some other GNSS. A-GPS is a positioning method based on satellite measurements with assistance data from a network. AFLT, OTDOA and E-OTD are positioning methods based on measurements for base stations. Positioning may also be performed based on measurements for a combination of satellites and base stations.

Most if not all terminal-based positioning methods, such as GPS, A-GPS, AFLT, etc., may achieve improved performance if a rough estimate of the location of terminal 110 or a reference location is known prior to location determination. The reference location may be the location of a base station received by terminal 110. Terminal 110 may establish a positioning session with a location server via a positioning protocol such as IS-801, Radio Resource LCS Protocol (RRLP), Radio Resource Control (RRC), Generic Positioning Protocol (GPP), etc. Terminal 110 may obtain the reference location from the location server during the positioning session. However, obtaining the reference location in this manner may (i) consume network resources to establish the positioning session and (ii) delay positioning until the reference location is received from the location server.

Terminal 110 may more readily obtain a reference location from location information sent by a base station. Terminal 110 may use the reference location as an initial location estimate for a positioning method, which may iteratively compute a final location estimate for terminal 110. The availability of the reference location may reduce the amount of time to obtain the final location estimate for terminal 110.

The uncertainty information may also be useful for other purposes. For example, terminal 110 may keep a navigation model for satellites, e.g., for GPS satellites. The navigation model may be used to predict the orbits of the satellites and may be valid for an extended period of time, e.g., hours, days, or weeks, depending on the model. The uncertainty information may be used to determine whether the navigation model stored at terminal 110 is still valid, in which case terminal 110 does not need to communicate with a location server to obtain assistance data to update the navigation model. The uncertainty information may thus be used to reduce the number of times terminal 110 needs to obtain assistance data, which may reduce signaling overhead and avoid delay for positioning.

FIG. 4 shows a design of a process 400 for sending location information by a transmitter, which may be a base station, a terminal, or some other entity. The transmitter may generate a message comprising coordinate information and uncertainty information for the location of the transmitter (block 412). The transmitter may send the message to at least one receiver in a wireless network (block 414).

In one design, the coordinate information may comprise latitude and longitude for horizontal location of the transmitter. The uncertainty information may comprise uncertainty of the horizontal location of the transmitter, which may be given by a radius of a circle centered at the latitude and longitude of the transmitter, e.g., as shown in FIG. 2. The circle may be defined as described above. The coordinate information may further comprise the height of the transmitter. The uncertainty information may further comprise uncertainty of the reported height of the transmitter, which may be given by a deviation from the height of the transmitter, e.g., as shown in FIG. 3.

In one design, the message may comprise (i) a latitude field carrying the latitude of the transmitter or a designated value (e.g., all zeros) if the latitude is not known and (ii) a longitude field carrying the longitude of the transmitter or a designated value (e.g., all zeros) if the longitude is not known. The message may further comprise a height field carrying the height of the transmitter or a designated value (e.g., all ones) if the height is not known. The message may further comprise (i) a horizontal location uncertainty field carrying the uncertainty of the horizontal location of the transmitter and (ii) a vertical location uncertainty field carrying the uncertainty of the height of the transmitter.

The transmitter may be a base station, and the at least one receiver may be at least one terminal. In one design, the message may be an overhead message that may be broadcast from the base station to terminals within the coverage of the base station. The overhead message may be a System Parameters Message or an MC-RR Parameters Message in IS-2000 or some other message in other radio technologies. In another design, the message may be a unicast message that may be sent from the base station to a specific terminal. The unicast message may be a Mobile Station Registered Message or a Base Station Status Response Message in IS-2000 or some other message in other radio technologies.

FIG. 5 shows a design of a process 500 for broadcasting location information by a base station. The base station may generate an overhead message comprising a latitude (e.g., BASE_LAT) field carrying latitude of the base station, a longitude (e.g., BASE_LONG) field carrying longitude of the base station, and a horizontal location uncertainty (e.g., LOC_UNC_H) field carrying uncertainty of horizontal location of the base station (block 512). The overhead message may further comprise a height field (e.g., HEIGHT) carrying the height of the base station and a vertical location uncertainty field (e.g., LOC_UNC_V) carrying uncertainty of the height of the base station. The overhead message may further comprise an indicator (e.g., ADD_LOC_INFO_INCL) field that may be set (i) to a first value to indicate the overhead message including the horizontal location uncertainty field, the height field, and the vertical location uncertainty field or (ii) to a second value to indicate the overhead message omitting the horizontal location uncertainty field, the height field, and the vertical location uncertainty field. The base station may broadcast the overhead message to terminals within the coverage of the base station (block 514).

Figure 6:
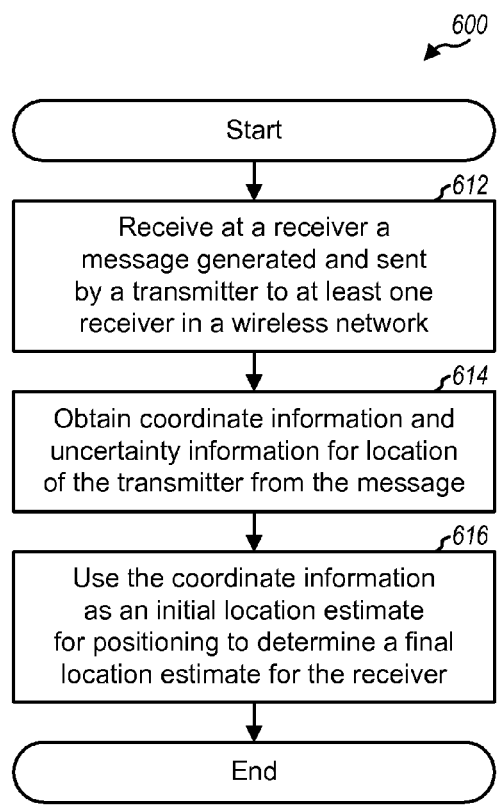
FIG. 6 shows a process for receiving location information by a receiver.

FIG. 6 shows a design of a process 600 for receiving location information by a receiver, which may be a terminal or some other entity. The receiver may receive a message generated and sent by a transmitter to at least one receiver in a wireless network (block 612). The receiver may obtain coordinate information and uncertainty information for the location of the transmitter from the message (block 614). The receiver may use the coordinate information as an initial location estimate for positioning to determine a final location estimate for the receiver (block 616). The receiver may also determine whether to obtain assistance data for a GNSS (e.g., GPS) based on the coordinate information and the uncertainty information. The receiver may also use the coordinate information and the uncertainty information for other purposes.

In one design, the coordinate information may comprise latitude and longitude for the horizontal location of the transmitter, and the uncertainty information may comprise uncertainty of the horizontal location. The coordinate information may further comprise the height of the transmitter, and the uncertainty information may further comprise uncertainty of the height of the transmitter.

The transmitter may be a base station, and the receiver may be a terminal. The message may comprise an overhead message that may be broadcast by the base station to terminals within the coverage of the base station. The message may also comprise a unicast message that may be sent by the base station to a specific terminal.

Figure 7:
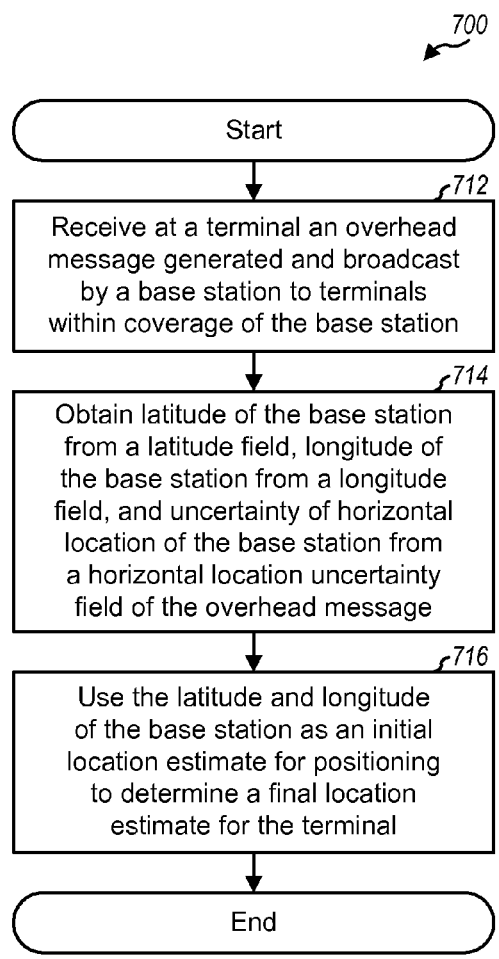
FIG. 7 shows a process for receiving location information by a terminal.

FIG. 7 shows a design of a process 700 for receiving location information by a terminal. The terminal may receive an overhead message generated and broadcast by a base station to terminals within coverage of the base station (block 712). The terminal may obtain latitude of the base station from a latitude field, longitude of the base station from a longitude field, and uncertainty of horizontal location of the base station from a horizontal location uncertainty field of the overhead message (block 714). The terminal may also obtain the height of the base station from a height field and uncertainty of the height of the base station from a vertical location uncertainty field of the overhead message. The terminal may determine whether an indicator field of the overhead message is set to a first value or a second value. The terminal may read the horizontal location uncertainty field, the height field, and the vertical location uncertainty field if the indicator field is set to the first value, e.g., '1'. The terminal may skip the horizontal location uncertainty field, the height field, and the vertical location uncertainty field if the indicator field is set to the second value, e.g., '0'. The terminal may use the latitude and longitude of the base station as an initial location estimate for positioning to determine a final location estimate for the terminal (block 716). The terminal may also use the location information for the base station for other purposes.

Figure 8:
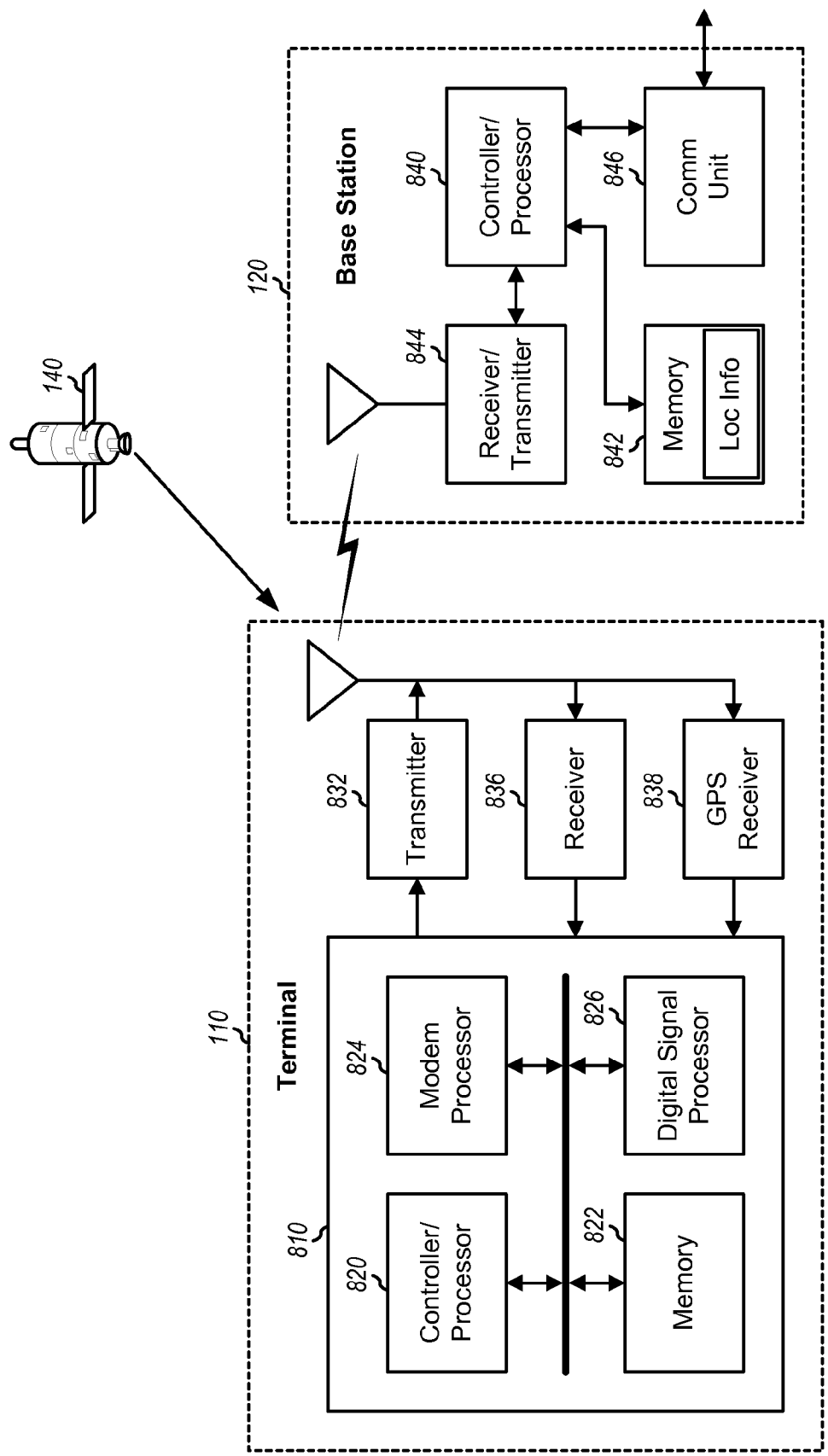
FIG. 8 shows a block diagram of a terminal and a base station.

FIG. 8 shows a block diagram of a design of terminal 110 and base station 120 in FIG. 1. At terminal 110, a modem processor 824 may receive data to be sent by terminal 110, process (e.g., encode and modulate) the data, and generate output samples. A transmitter 832 may condition (e.g., convert to analog, filter, amplify, and frequency upconvert) the output samples and generate a reverse link signal, which may be transmitted to base station 120. On the forward link, terminal 110 may receive a forward link signal from base station 120. A receiver 836 may condition (e.g., filter, amplify, frequency downconvert, and digitize) the received signal and provide input samples. Modem processor 824 may process (e.g., demodulate and decode) the input samples and provide decoded data. Modem processor 824 may perform processing in accordance with a radio technology (e.g., IS-2000, WCDMA, E-UTRA, 802.11, 802.16, etc.) utilized by base station 120. A digital signal processor 826 may perform various types of processing for terminal 110, e.g., positioning to determine a location estimate for terminal 110.

A GPS receiver 838 may receive and measure signals from satellites 140. The measurements may be processed (e.g., by processor 826) to obtain an accurate location estimate for terminal 110. An initial location estimate or a reference location may be determined based on location information received from base station 120.

A controller/processor 820 may direct the operation at terminal 110. Processor 820, 824 and/or 826 may perform or direct process 400 in FIG. 4, process 600 in FIG. 6, process 700 in FIG. 7, and/or other processes for the techniques described herein. A memory 822 may store program codes and data for terminal 110. Memory 822 may store location information for each base station obtained from overhead and/or unicast messages received from the base station. Processors 820, 824 and 826 and memory 822 may be implemented on an application specific integrated circuit (ASIC) 810.

For simplicity, FIG. 8 shows one controller/processor 840, one memory 842, one receiver/transmitter 844, and one communication (Comm) unit 846 for base station 120.

In general, base station 120 may include any number of controllers, processors, memories, transmitters, receivers, communication units, etc. Controller/processor 840 may perform various functions for communication with the terminals, memory 842 may store program codes and data for access network 120, transmitter/receiver 844 may support radio communication with the terminals, and communication unit 846 may support communication with other network entities. Processor 840 may perform or direct process 400 in FIG. 4, process 500 in FIG. 5, process 600 in FIG. 6, and/or other processes for the techniques described herein. Memory 842 may store location information for base station 120.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
generating at a transmitter an overhead message comprising coordinate information and uncertainty information associated with the transmitter wherein the uncertainty information comprises uncertainty of a horizontal location of the transmitter; and
broadcasting the overhead message from the transmitter to terminals within coverage of the transmitter, wherein the overhead message is broadcast prior to establishing a positioning session with the terminals via a positioning protocol.

2. The method of claim 1, wherein the coordinate information comprises a latitude and longitude for the horizontal location of the transmitter.

3. The method of claim 2, wherein the uncertainty of the horizontal location of the transmitter is given by a radius of a circle centered at the latitude and longitude of the transmitter.

4. The method of claim 2, wherein the message comprises a latitude field and a longitude field, the latitude field carrying the latitude of the transmitter or a first designated value if the latitude is not known, and the longitude field carrying the longitude of the transmitter or a second designated value if the longitude is not known.

5. The method of claim 2, wherein the coordinate information further comprises height of the transmitter, and wherein the uncertainty information further comprises uncertainty of the height of the transmitter.

6. The method of claim 5, wherein the uncertainty of the height of the transmitter is given by a deviation from the height of the transmitter.

7. The method of claim 5, wherein the message comprises a height field carrying the height of the transmitter or a designated value if the height is not known.

8. The method of claim 1, wherein the message is a System Parameters Message or an MC-RR Parameters Message in IS-2000.

9. The method of claim 1 wherein the transmitter is a macro base station and the coverage of the macro base station is a macro cell.

10. The method of claim 1 wherein the transmitter is a pico base station and the coverage of the pico base station is a pico cell.

11. The method of claim 1 wherein the transmitter is a femto base station and the coverage of the femto base station is a femto cell.

12. The method of claim 1 wherein the uncertainty information is indicative of a percentage of a coverage area of the transmitter.

13. The method of claim 1 wherein the uncertainty information is indicative of an area within which a portion of the terminals within the coverage of the transmitter are located.

14. The method of claim 1 wherein the overhead message further comprises a sequence number, wherein the sequence number can vary based on changes to the coordinate information or the uncertainty information.

15. A method for wireless communication, comprising:
generating at a base station a unicast message comprising coordinate information and uncertainty information associated with the base station wherein the uncertainty information comprises uncertainty of a horizontal location of the base station; and
sending the unicast message from the base station to a specific terminal, wherein the unicast message is sent prior to establishing a positioning session with the specific terminal via a positioning protocol.

16. An apparatus for wireless communication, comprising:
at least one processor configured to generate at a transmitter an overhead message comprising coordinate information and uncertainty information associated with the transmitter wherein the uncertainty information comprises uncertainty of a horizontal location of the transmitter, and to broadcast the overhead message from the transmitter to terminals within coverage of the transmitter, wherein the overhead message is broadcast prior to establishing a positioning session with the terminals via a positioning protocol.

17. The apparatus of claim 16, wherein the coordinate information comprises a latitude and longitude for the horizontal location of the transmitter.

18. The apparatus of claim 17, wherein the coordinate information further comprises height of the transmitter, and wherein the uncertainty information further comprises uncertainty of the height of the transmitter.

19. The apparatus of claim 18, wherein the uncertainty of the horizontal location of the transmitter is given by a radius of a circle centered at the latitude and longitude of the transmitter, and wherein the uncertainty of the height of the transmitter is given by a deviation from the height of the transmitter.

20. An apparatus for wireless communication, comprising:
means for generating at a transmitter an overhead message comprising coordinate information and uncertainty information associated with the transmitter wherein the uncertainty information comprises uncertainty of a horizontal location of the transmitter; and
means for broadcasting the overhead message from the transmitter to terminals within coverage of the transmitter, wherein the overhead message is broadcast prior to establishing a positioning session with the terminals via a positioning protocol.

21. The apparatus of claim 20, wherein the coordinate information comprises a latitude and longitude for the horizontal location of the transmitter.

22. The apparatus of claim 21, wherein the coordinate information further comprises height of the transmitter, and wherein the uncertainty information further comprises uncertainty of the height of the transmitter.

23. The apparatus of claim 22, wherein the uncertainty of the horizontal location of the transmitter is given by a radius of a circle centered at the latitude and longitude of the transmitter, and wherein the uncertainty of the height of the transmitter is given by a deviation from the height of the transmitter.

24. A computer program product, comprising:
a non-transitory computer-readable storage medium comprising:
code for causing at least one computer to generate at a transmitter an overhead message comprising coordinate information and uncertainty information associated with the transmitter wherein the uncertainty information comprises uncertainty of a horizontal location of the transmitter, and
code for causing the at least one computer to broadcast the overhead message from the transmitter to terminals within coverage of the transmitter, wherein the overhead message is broadcast prior to establishing a positioning session with the terminals via a positioning protocol.

25. A method for wireless communication, comprising:
generating at a base station an overhead message comprising a latitude field carrying latitude of the base station, a longitude field carrying longitude of the base station, and a horizontal location uncertainty field carrying uncertainty of the horizontal location of the base station; and
broadcasting the overhead message from the base station to terminals within coverage of the base station, wherein the overhead message is broadcast prior to establishing a positioning session with the terminals via a positioning protocol.

26. The method of claim 25, wherein the overhead message further comprises a height field carrying height of the base station and a vertical location uncertainty field carrying uncertainty of the height of the base station.

27. The method of claim 26, wherein the overhead message further comprises an indicator field set to a first value to indicate the overhead message including the horizontal location uncertainty field, the height field, and the vertical location uncertainty field or to a second value to indicate the overhead message omitting the horizontal location uncertainty field, the height field, and the vertical location uncertainty field.

28. A method for wireless communication, comprising:
receiving at a terminal an overhead message generated and sent by a transmitter to at least one receiver in a wireless network, wherein the overhead message is received prior to establishing a positioning session via a positioning protocol; and
obtaining coordinate information and uncertainty information associated with the transmitter from the overhead message wherein the uncertainty information comprises uncertainty of a horizontal location of the transmitter.

29. The method of claim 28, wherein the coordinate information comprises a latitude and longitude for the horizontal location of the transmitter.

30. The method of claim 29, wherein the coordinate information further comprises height of the transmitter, and wherein the uncertainty information further comprises uncertainty of the height of the transmitter.

31. The method of claim 30, wherein the uncertainty of the horizontal location of the transmitter is given by a radius of a circle centered at the latitude and longitude of the transmitter, and wherein the uncertainty of the height of the transmitter is given by a deviation from the height of the transmitter.

32. The method of claim 28, further comprising:
using the coordinate information as an initial location estimate for positioning to determine a final location estimate for the terminal.

33. The method of claim 28, further comprising:
determining whether to obtain assistance data for a global navigation satellite system (GNSS) based on the coordinate information and the uncertainty information.

34. The method of claim 28 wherein the overhead message includes a sequence number.

35. The method of claim 34 comprising:
storing the sequence number of the overhead message as a first sequence number;
receiving a second overhead message generated and sent by the transmitter, wherein the second overhead message includes a second sequence number and coordinate information and uncertainty information associated with the transmitter;
comparing the second sequence number with the first sequence number; and
obtaining the coordinate information and the uncertainty information associated with the transmitter from the second overhead message if the values of the first sequence number and the second sequence number are different.

36. An apparatus for wireless communication, comprising:
at least one processor configured to receive at a terminal an overhead message generated and sent by a transmitter to at least one receiver in a wireless network, wherein the overhead message is received prior to establishing a positioning session via a positioning protocol, and to obtain coordinate information and uncertainty information associated with the transmitter from the overhead message wherein the uncertainty information comprises uncertainty of a horizontal location of the transmitter.

37. The apparatus of claim 36, wherein the coordinate information comprises a latitude and longitude for the horizontal location of the transmitter.

38. The apparatus of claim 37, wherein the coordinate information further comprises height of the transmitter, and wherein the uncertainty information further comprises uncertainty of the height of the transmitter.

39. The apparatus of claim 38, wherein the uncertainty of the horizontal location of the transmitter is given by a radius of a circle centered at the latitude and longitude of the transmitter, and wherein the uncertainty of the height of the transmitter is given by a deviation from the height of the transmitter.

40. A method for wireless communication, comprising:
receiving at a terminal an overhead message generated and broadcast by a base station to terminals within coverage of the base station, wherein the overhead message is received prior to establishing a positioning session via a positioning protocol; and
obtaining latitude of the base station from a latitude field, longitude of the base station from a longitude field, and uncertainty of horizontal location of the base station from a horizontal location uncertainty field of the overhead message.

41. The method of claim 40, further comprising:
obtaining height of the base station from a height field and uncertainty of the height of the base station from a vertical location uncertainty field of the overhead message.

42. The method of claim 41, further comprising:
determining whether an indicator field of the overhead message is set to a first value or a second value;
reading the horizontal location uncertainty field, the height field, and the vertical location uncertainty field of the overhead message if the indicator field is set to the first value; and
skipping the horizontal location uncertainty field, the height field, and the vertical location uncertainty field if the indicator field is set to the second value.

* * * * *